United States Patent [19]

Kovach et al.

[11] Patent Number: 6,012,534
[45] Date of Patent: Jan. 11, 2000

[54] MINIMUM SOIL DISPLACEMENT CHISEL PLOW AND SOIL FIRMING WHEEL ARRANGEMENT

[75] Inventors: Michael G. Kovach, Morton; William J. Dietrich, Sr., Congerville, both of Ill.

[73] Assignee: Case Corporation, Racine, Wis.

[21] Appl. No.: 09/003,719

[22] Filed: Jan. 6, 1998

Related U.S. Application Data

[60] Provisional application No. 60/034,978, Jan. 7, 1997.

[51] Int. Cl.[7] .................................................. A01B 49/02
[52] U.S. Cl. ........................................... 172/196; 172/156
[58] Field of Search ..................................... 172/133, 134, 172/135, 140, 156, 170, 174, 175, 176, 195, 196; 111/52, 140, 148, 924

[56] References Cited

U.S. PATENT DOCUMENTS

| | | |
|---|---|---|
| 2,694,356 | 11/1954 | Haas ..................... 172/176 X |
| 3,170,421 | 2/1965 | Norris et al. . |
| 3,967,564 | 7/1976 | Emling ................. 172/145 X |
| 4,187,916 | 2/1980 | Harden et al. . |
| 4,213,408 | 7/1980 | West et al. . |
| 4,239,054 | 12/1980 | Hatcher . |
| 4,241,674 | 12/1980 | Mellinger . |
| 4,377,979 | 3/1983 | Peterson et al. . |
| 4,524,837 | 6/1985 | Harden . |
| 4,560,010 | 12/1985 | Weichel . |
| 4,596,199 | 6/1986 | Dietrich, Sr. . |
| 4,601,248 | 7/1986 | Beasley . |
| 4,653,410 | 3/1987 | Typpi ..................... 111/52 X |
| 4,729,435 | 3/1988 | Urich . |
| 4,762,181 | 8/1988 | Cox . |
| 4,865,132 | 9/1989 | Moore, Jr. . |
| 5,161,472 | 11/1992 | Handy ..................... 111/52 X |
| 5,333,694 | 8/1994 | Roggenbuck . |
| 5,349,911 | 9/1994 | Holst . |
| 5,499,685 | 3/1996 | Downing, Jr. ........... 172/151 X |
| 5,540,288 | 7/1996 | Dietrich, Sr. . |
| 5,623,997 | 4/1997 | Rawson et al. ........... 172/156 |

*Primary Examiner*—Robert E. Pezzuto
*Attorney, Agent, or Firm*—Emrich & Dithmar

[57] ABSTRACT

An agricultural chisel plow row unit designed for minimum soil displacement has a pair of spring-biased firming wheels mounted to either side of and behind the plow shank to firm the surface of the berm formed by the breaking point without affecting the operating depth of the point.

10 Claims, 2 Drawing Sheets

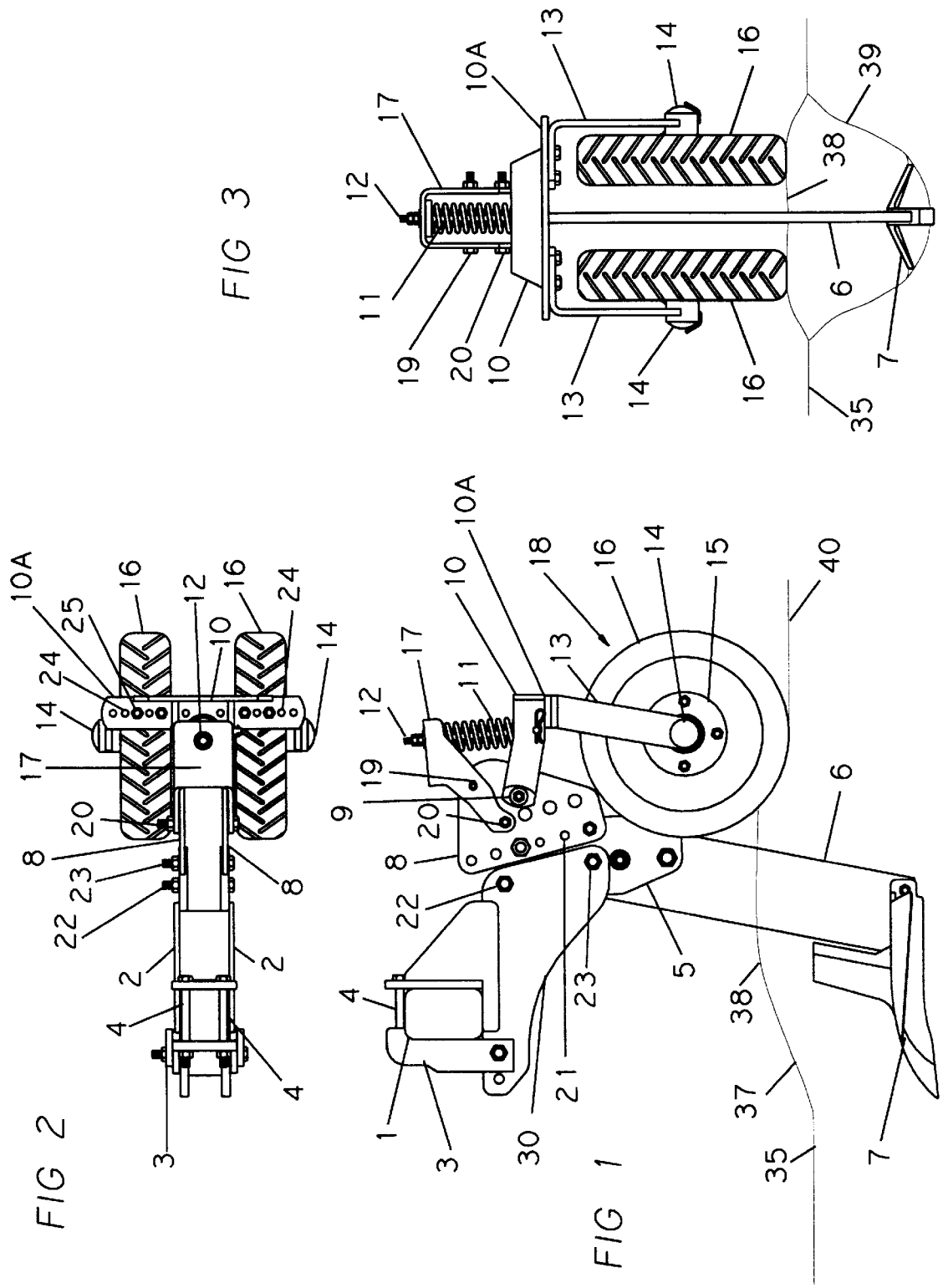

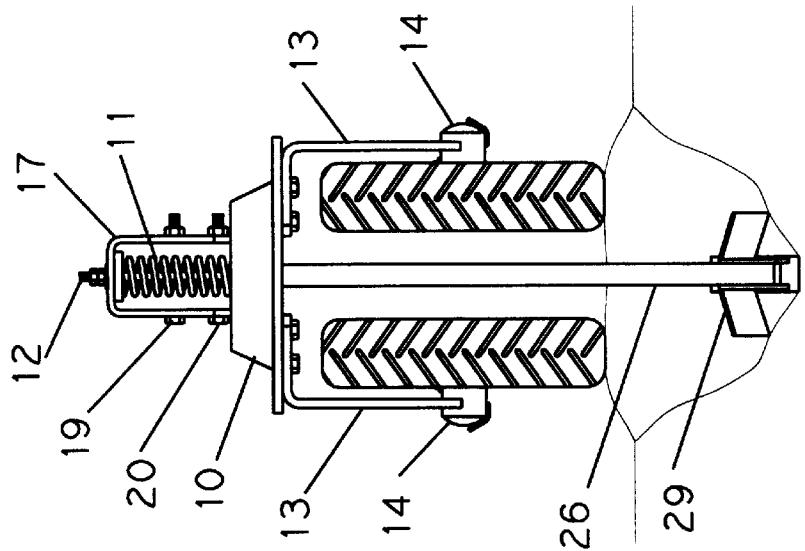
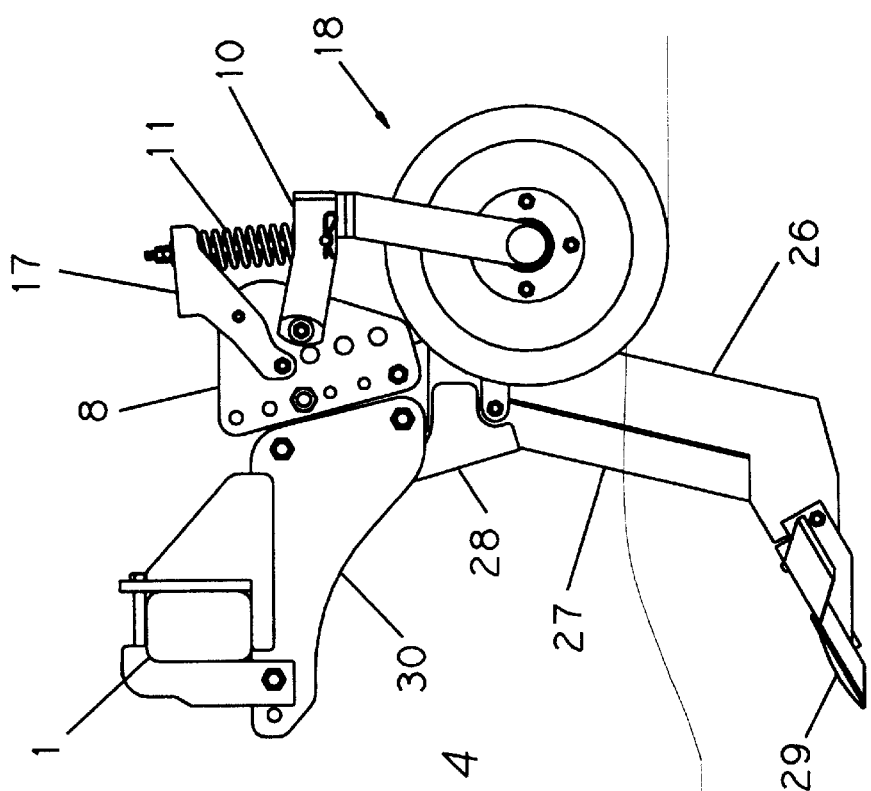

ND SOIL FIRMING WHEEL
MINIMUM SOIL DISPLACEMENT CHISEL PLOW AND SOIL FIRMING WHEEL ARRANGEMENT

RELATED APPLICATION

This application claims the benefit of copending U.S. Provisional Application Ser. No. 60/034,978, filed Jan. 7, 1997.

FIELD OF THE INVENTION

The present invention relates to agricultural tillage equipment, namely chisel plows which we refer to as Minimum Soil Displacement chisel plows. More particularly, the invention relates to an arrangement of wheels for use with minimum soil displacement chisel plows to firm the surface of the tilled soil and to close the furrow in the soil left by the shank of the chisel plow.

BACKGROUND OF THE INVENTION

During the 1970s and early 1980s, many farmers became conscious of the need to conserve their most valuable resource—namely, the soil itself. Farmers became aware that prior practices in deep tillage using moldboard plows were useful in that they loosened soil to depths of 6–8 inches, which promoted root growth, moisture retention and plant development, but this benefit occurred with a substantial loss of valuable topsoil through erosion.

Farmers began experimenting with practices referred to as "no-till" farming (in which crop residue is simply left on the top of the soil and there is, literally, no primary tillage of the soil) ridge-till farming, and other methods. Eventually, many of the practices and techniques evolved into a broad category of farming referred to as "conservation tillage". Individually practices may vary widely depending upon weather conditions, soil conditions, the nature of the crop, and many other factors. However, most farmers in the 1980s and 1990s began to practice at least some techniques for soil conservation, yet they found the need, as well, for at least some primary tillage.

It was in such circumstances that it became popular to use chisel plows with "no-till" or MRD (minimum residue displacement) shanks, as distinguished from conventional parabolic shanks, which create greater soil disruption and surface residue displacement. The arrangements, configurations and plow point structure employed vary widely.

In general, Minimum Soil Displacement (or MSD for short) chisel plow row units are mounted to a common frame or toolbar. The units are spaced transversely of the direction of travel on an implement drawn by a tractor. Each MSD chisel plow has a generally vertical shank made from heavy plate stock for mounting to the toolbar or frame of the implement and a plow point mounted at the bottom of the shank and intended to operate at the desired depth to fracture the soil at that depth and up to the surface. The soil is broken in a trough of increasing width progressing from the operating depth of the plow point to the surface of the soil. Not all the soil is tilled. Obviously, since the soil worked by the plows is fractured and loosened, it becomes aerated or "puffed up"; and each MSD chisel plow leaves behind it a slightly elevated profile of loosened soil relative to the compacted soil which is not tilled by the row unit.

In loosening and fracturing soil, an MSD chisel plow, thus, necessarily creates a slight berm or ridge of raised, loosened soil after working the soil. The height of the berm may be more pronounced with little or no lateral displacement of the soil and surface residue during plowing. If plowing is done in the fall, then the loosened soil tends to compact with time and the effects of weather, and the shape of the soil after settling back over the winter may leave an uneven surface profile. If the berm is too high, soil may be displaced off the berm into the region between swaths worked by the row units, thus creating an undesirable lateral displacement of soil, and an even more uneven surface profile.

It is desirable to use plow points which fracture and loosen the soil, but which do not throw the soil laterally to the side of the chisel plow, such as is disclosed in U.S. Pat. No. 5,540,288, entitled "PRIMARY TILLAGE UNIT WITH REDUCED DISTURBANCE OF SURFACE SOIL AND RESIDUE". If the soil is displaced from the trough or swath in which the row unit operates, then, after the loosened soil becomes compacted over time, there will be a net lateral displacement of soil, and a slight swale or trough will be created where the chisel plows had operated, after the loosened soil re-compacts with time and weathering. This effect can be cumulative over the years for those cases, which are believed to be significant in number, where the farmer plants row crops in the same row locations, year after year.

Moreover, there has been a desire to employ chisel plows with narrow, generally vertical shanks, formed from flat stock, such as disclosed in the '288 patent. These shanks are more rigid and more narrow than the curved shanks of parabolic shank chisel plows, which are designed to lift and "boil" the soil during operation, creating substantial soil and residue displacement. The shank is obviously a necessary element for mounting the breaking point, but it otherwise has no soil-tilling function, and it leaves behind it a furrow, the width of which depends on the width of the shank, the design of the leading edge of the shank, and to some extent, the soil-lifting and fracturing action of the point.

The furrow left by the shank behind a chisel plow does not have a substantial effect with respect to soil erosion, but it is considered to be undesirable for those farmers (and their numbers are growing) who desire to plow in the fall, after harvest, and then do no further tillage prior to planting the following spring.

SUMMARY OF THE INVENTION

The present invention provides for a pair of small, narrow wheels positioned on either side of the shank of an MSD chisel plow and slightly to the rear of the shank. The wheels, referred to as "firming wheels", are placed to operate and ride on the berm of loosened soil formed by the point of the chisel plow, but to the rear of the point and the shank, at a location at which the berm is fully formed. Thus, operating in loosened soil, like the firming wheels of a planter row unit, the wheels have no effect on setting the operating depth of the point, but they are biased slightly, in a downward direction, by means of a cushion spring so that they firm the surface of the berm without compacting the loosened soil substantially. And because the wheels operate on either side of the shank, they have the added function of urging loosened soil laterally inwardly to fill the groove or furrow left by the shank and flatten out the ridges sometimes formed by the sides of the shank.

By filling the furrow behind the shank, the wheels provide a more even soil profile as soon as the chisel plow has passed. By flattening and firming the surface of the berm, the wheels tend to reduce lateral displacement of soil from the berm during weathering. However, the tilled soil remains loose, aerated and capable of absorbing and retaining water down to the operating depth of the chisel plow.

Other features and advantages of the present invention will be apparent to persons skilled in the art from the following detailed description of a preferred embodiment accompanied by the attached drawing wherein identical reference numerals will refer to like parts in the various views.

BRIEF DESCRIPTION OF THE DRAWING

FIG. 1 is a side view of a chisel plow row unit incorporating the present invention;

FIG. 2 is a top view of the row unit of FIG. 1;

FIG. 3 is a partial rear view of the chisel plow of FIG. 1 showing the placement of the firming wheels relative to the shank, and illustrating an idealized view of the soil profile as the wheels pass over the loosened soil;

FIG. 4 is a side view of an alternate MSD shank row unit incorporating the invention; and FIG. 5 is a partial rear view of the row unit of FIG. 4.

DETAILED DESCRIPTION OF A PREFERRED EMBODIMENT

FIG. 1 shows a side view of an MSD chisel plow row unit comprising a shank 6 and wheel assembly generally designated 18 attached to a tubular frame or toolbar 1. The shank 6 is formed of heavy plate stock having a thickness of approximately ¾", although the dimension is not critical and characterized as generally vertical, although it extends slightly forwardly at the base.

The frame 1 may be mounted to a conventional three-point hitch of a tractor, in which case the frame is cantilevered behind the tractor, or it may be mounted to the tractor by a conventional hitch, and include its own support wheels. A number of row units, such as the one designated 30 in FIG. 1 are conventionally mounted to the frame 1, spaced at a desired setting, usually in the range of 24–36 in. Each shank mount assembly 30 is clamped to the frame or toolbar 1 with a bracket 3 that is held in place with bolts 4.

An adapter bracket 5 is bolted to shank mount assembly 30 allowing a conventional shank mount assembly to be used with different adapter brackets so that different shanks 6 can be mounted to the same mount assembly 30. A conventional ground-breaking point 7 is attached to the shank 6.

A pair of side plates 8 also mount to the adapter brackets 5 and the bolt 9 provides a horizontal pivot axis for wheel mount bracket 10. A spring 11, to be described further below, biases the wheel mount bracket 10 to rotate clock-wise about the pivot bolt 9. Spring 1 urges the wheel assembly 18 to a downward position with wheels 16 engaging and riding along the top of berms formed by the chisel plow, yet cushioning any upward movement of the wheel assembly, as obstacles or uneven contours are encountered. A stop bolt 12 limits the downward travel of the wheel assembly 18. A pair of wheel mount arms 13 (FIG. 3) are located with one arm on each side of the mounting bracket 10. Wheel mount arms 13 have hubs and spindles 14 at their lower ends for mounting the wheels.

Welded to the spindle of each wheel mount arm 13 is a flange 15 to which wheels 16 are bolted. A U-shaped bracket 17, best seen in FIG. 3, provides an upper, fixed seat for the spring 11 to compress against. This allows the wheels to follow the soil contour while pressing on the loosened soil with a generally uniform firming force. Spring bracket 17 is rigidly attached to wheel mount plates 8 with bolts 19 (which may be a shear bolt) and 20.

Extra holes 21 are provided in the side plates 8 to allow vertical adjustment of the wheel assembly for different operating depths of the chisel plows.

Referring to FIG. 2, pivot mount bracket 10 includes a flat mounting bar 10A which includes a number of pairs of holes 24, one on each side of the fore-to-aft center line of the shank. Each pair is spaced further outboard of the center line. Holes 24 permit adjusting the wheels closer to or further away from the shank assembly.

The wheel mount arms 13 may have slotted holes so that bolts 25 can be loosened and the wheels can be angled slightly relative to the direction of travel, in addition to being adjusted laterally.

Turning now to the embodiment of FIGS. 4 and 5, the shank mount assembly 30 is the same as described above, and the structure for mounting the assembly 30 to a toolbar 1 is also similar to that which has already been described. Moreover, the side plates 8, spring mounting bracket 17, cushion spring 11 and wheel assembly 18 are all similar to those described in connection with the first embodiment.

In the embodiment of FIGS. 4 and 5, a different (thicker—i.e., approximately 1¼ in.) shank 26, and winged point 29 are shown. In this embodiment, a forward, V-shaped fin 27 is employed for assisting in parting the soil above the operating level of the point 29; and a trash guard 28 is mounted to the upper portion of the shank 26 to prevent residue from lodging above the fin 27. Otherwise, as can be seen by comparing FIGS. 5 and 3, the firming wheel assembly 28 is substantially the same in structure and operation for both embodiments.

As used herein, then, the term Minimum Soil Displacement chisel plow is one which has a rigid flat shank which is narrow (approximately ¾ in.) and is rigid and extends slightly forwardly toward the base where a breaking point, preferably winged, is mounted.

Turning now to FIGS. 1 and 3, in operation, it will be appreciated that the ground-engaging portion of the firming wheels 16 is located to the rear of the shank 6, and even more to the rear of the location of actual soil-fracturing, when considering that the point 7 extends in front of the shank 6, and it is the point 7 which accomplishes the soil-fracturing function.

As seen in FIG. 1, in an idealized sketch of the soil profile, reference numeral 35 represents the profile of compacted soil, prior to tillage. As the point 7 is drawn through the soil at the desired operating depth, the level of soil at the surface begins to rise according to the portion of the contour designated 37. After the point 7 has passed and completed tillage, the level of a berm (idealized) formed by the loosened, fractured soil is designated 38. Although not shown in the idealized soil profiles of the drawing, passing the shank 6 through the tilled soil creates, in its wake, a furrow behind the shank at the transverse center of the berm created by tillage—i.e., in the wake of the shank, and sometimes a slightly raised ridge on either side of the shank, next to the furrow.

Turning now to FIG. 3, a transverse soil profile is illustrated, the untilled soil level being designated 35. A trough 39 is formed by operation of the point 7. The trough represented by the generally U-shaped contour 39 represents, in idealized form, the boundary between tilled and untilled soil, the tilled soil being above the point 7 and less compacted in the general form of a trough with upwardly and outwardly inclined sides. This soil profile characterizes the operation of a Minimum Soil Displacement chisel plow.

It will be appreciated from FIG. 3 that the wheels 16 are spaced laterally of the shank 6, but they are close enough that they engage the top or raised portion 38 of the berm formed by the point. Since the wheels 16 operate in loosened, tilled soil, they are able to move the soil laterally inward to close the furrow behind the shank 6 and lower the ridges adjacent the shank while slightly firming the crest 38 of the berm (see FIG. 1 which, again, presents an idealized contour), and without substantial compaction of the deeper soil. The final level of the berm, following passage of the wheels 16 is designated by reference numeral 40. By firming the berm, as demonstrated above, not only does the loosened soil fill the furrow behind the shank, but it also levels the berm somewhat, and reduces the tendency of the loosened top soil to be moved laterally outwardly by wind or rain. Thus, the overall soil profile in the Spring, following tillage in the Fall, and weathering between tillage and planting, is a more level field ready for planting without the need for further tillage, discing or harrowing. Whatever additional leveling or soil working may be desired for planting, tools carried on the planter itself will be sufficient, thereby obviating a separate treating operation prior to planting.

It will also be observed that the operating depth of the points is set by the level of the toolbar 1 at whatever depth adjustments are made when the shank 6 of the chisel plow is mounted to the toolbar mounting assembly 30. The restoring or cushioning force of the spring 11 is sufficiently small so that it has negligible effect on the operating depth of the point 7. The function of the spring 11 is to permit the wheels to follow rises and depressions in ground contour along the direction of travel, and to provide a slight, downward force to firm the top of the berm surface in operation.

Having thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

We claim:

1. In combination with a Minimum Soil Displacement chisel plow row unit having a generally vertical shank of flat stock and having a base, said shank adapted to be mounted to an implement frame and a point mounted to the base of said shank and extending in front of said shank in use for fracturing sub-surface soil and producing an elevated berm of loosened soil after said point has passed, said berm extending laterally of said shank to form left and right sections, the combination comprising: a wheel frame pivotally mounted to said row unit for rotation about a horizontal axis transverse of the direction of travel of said unit; said wheel frame having left and right wheel support arms carrying left and right ground-engaging wheels respectively; spring means for resiliently urging said wheel frame downwardly, characterized in that said left and right wheels are spaced to ride on the surface of said left and right berms sections respectively, and immediately to the rear of said shank, whereby said left and right wheels firm the crests of said berm sections, secure the loosened soil in place and close the furrow behind said shank.

2. The apparatus of claim 1 characterized in that said chisel plow point breaks and loosens the soil in a band and that said berm of loosened soil is produced by the action of said point, the width of said first and second wheels each being less than the width of one of said berm sections of loosened soil whereby said wheels ride substantially entirely on the loosened soil of said berm sections.

3. The apparatus of claim 2 further characterized in that the down pressure exerted by said spring means on said wheel frame is sufficient to cause said wheels to firm said berm behind said shank but does not substantially affect the operating depth of said unit.

4. The apparatus of claim 3 further including mounting plate means, means for rigidly connecting said mounting plate means to said shank and further including adjustable mounting means for adjusting the height of said mounting plate means on said shank; a spring bracket mounted to said mounting plate means, said spring means being mounted between said spring bracket and said wheel frame for urging said wheel frame downwardly; said mounting of said wheel frame being arranged for pivotal motion of said wheel frame relative to said mounting plate means.

5. The apparatus of claim 3 wherein said wheel frame comprises a bracket pivotally mounted to said row unit and having a plurality of pairs of mounting holes, each pair having one hole on either side of the center line of said shank, said pairs being spaced progressively outwardly of said centerline, said wheel support arms being bolted to said bracket at said holes, said holes permitting lateral adjustment of said wheel arms.

6. The apparatus of claim 5 wherein each of said wheel support arms includes an inwardly-extending upper portion adapted to mount to said wheel frame bracket at said pairs of holes, each of said upper portions of said wheel support arms including an elongated slot extending generally in the direction of travel of said unit and permitting said wheels to be inclined relative to the direction of travel.

7. The apparatus of claim 6 wherein said spring means includes a spring bracket carried by said row unit; a coil spring interposed between said wheel frame bracket and said spring bracket and urging said wheel frame bracket downwardly; and a bolt extending through said coil spring having one end connected to said wheel frame bracket and the other end passing through said spring bracket, said spring bolt acting to limit the movement of said wheel frame bracket downwardly relative to said spring bracket.

8. In combination, a Minimum Soil Displacement chisel plow row unit having a narrow, rigid generally upright shank of flat stock and having a base, said shank adapted to be mounted to an implement frame and a soil-breaking point mounted to the base of said shank and extending in front of said shank in use for fracturing sub-surface soil in a trough characterized as having upwardly and outwardly extending sides and producing an elevated berm of loosened soil after said point has passed, said berm extending laterally of said shank to form right and left sections; a wheel frame pivotally mounted to said chisel plow row unit for rotation about a horizontal axis transverse of the direction of travel of said unit; said wheel frame having left and right wheel support arms carrying respectively left and right ground-engaging wheels; spring means for resiliently urging said wheel frame downwardly and characterized in that said left and right wheels are spaced to either side of said shank and are generally parallel to the direction of travel, said left and right wheels riding on the surfaces of said left and right sections of said berm respectively, and to the rear of said shank, whereby said left and right wheels firm the surface of said berm behind said shank and close the furrow behind said shank, and thereby reduce any ridge formed adjacent the furrow formed by said shank.

9. The apparatus of claim 8 further comprising mounting plate means for carrying said spring means and said wheel frame; and means for mounting said mounting plate means to said shank and for adjusting the height of said mounting plate means on said shank.

10. In combination, a Minimum Soil Displacement chisel plow row unit having a narrow, rigid generally upright shank of flat stock and having a base, said shank adapted to be mounted to an implement frame; and a soil-breaking point mounted to the base of said shank and extending in front of said shank in use for fracturing sub-surface soil in a trough characterized as having upwardly and outwardly extending sides and producing an elevated berm of loosened soil after said point has passed, said berm extending laterally of said shank to form right and left sections; a wheel frame pivotally mounted to said chisel plow row unit for rotation about a horizontal axis transverse of the direction of travel of said unit; said wheel frame carrying left and right ground-engaging wheels; spring means for resiliently urging said wheel frame downwardly; and characterized in that said left and right wheels are spaced to either side of said shank and at least a portion of each wheel extends along a side of said shank, said left and right wheels riding on the surfaces of said left and right sections of said berm respectively, and immediately to the rear of said shank, whereby said left and right wheels firm the surface of said berm behind said shank and close the furrow behind said shank, and thereby reduce any ridge formed adjacent the furrow formed by said shank.

\* \* \* \* \*